United States Patent [19]

Banister

[11] Patent Number: 4,570,887

[45] Date of Patent: Feb. 18, 1986

[54] QUICK-CONNECT MOUNT FOR A CAMERA AND TRIPOD

[76] Inventor: Gerald K. Banister, 11738 Crazy Horse Trail, Conifer, Colo. 80433

[21] Appl. No.: 542,673

[22] Filed: Oct. 17, 1983

[51] Int. Cl.⁴ .......................................... F16M 11/04
[52] U.S. Cl. ................................. 248/187; 248/223.4
[58] Field of Search ............... 248/187, 177, 176, 188, 248/223.4; 354/293, 82, 81

[56] References Cited

U.S. PATENT DOCUMENTS

| | | | |
|---|---|---|---|
| 725,808 | 4/1903 | Weidner | 248/297.3 |
| 2,351,386 | 6/1944 | Zucker | 354/293 X |
| 2,756,956 | 7/1956 | Anderson | 354/293 X |
| 3,006,052 | 10/1961 | Stickney et al. | 248/187 |
| 3,612,462 | 10/1971 | Mooney | 248/187 X |
| 4,083,480 | 4/1978 | Lee et al. | 354/293 X |
| 4,091,402 | 5/1978 | Siegel | 354/293 |
| 4,306,790 | 12/1981 | Adams | 354/293 X |

Primary Examiner—J. Franklin Foss
Attorney, Agent, or Firm—Richard K. Thomson

[57] ABSTRACT

A quick-connect mount for a camera and tripod. A dovetail connector plate is attached to the camera by a flat-head screw. A receiving member with a similarly configured slot is attached to the tripod by threaded engagement between a threaded aperture in the receiving member and the threaded stud on the tripod. The tip of a thumb screw which is threadingly engaged through the side of the receiving member extends into a recess in the edge of the connector plate to lock the connector plate into the receiving member and, hence, the camera onto the tripod.

7 Claims, 4 Drawing Figures

U.S. Patent     Feb. 18, 1986     4,570,887
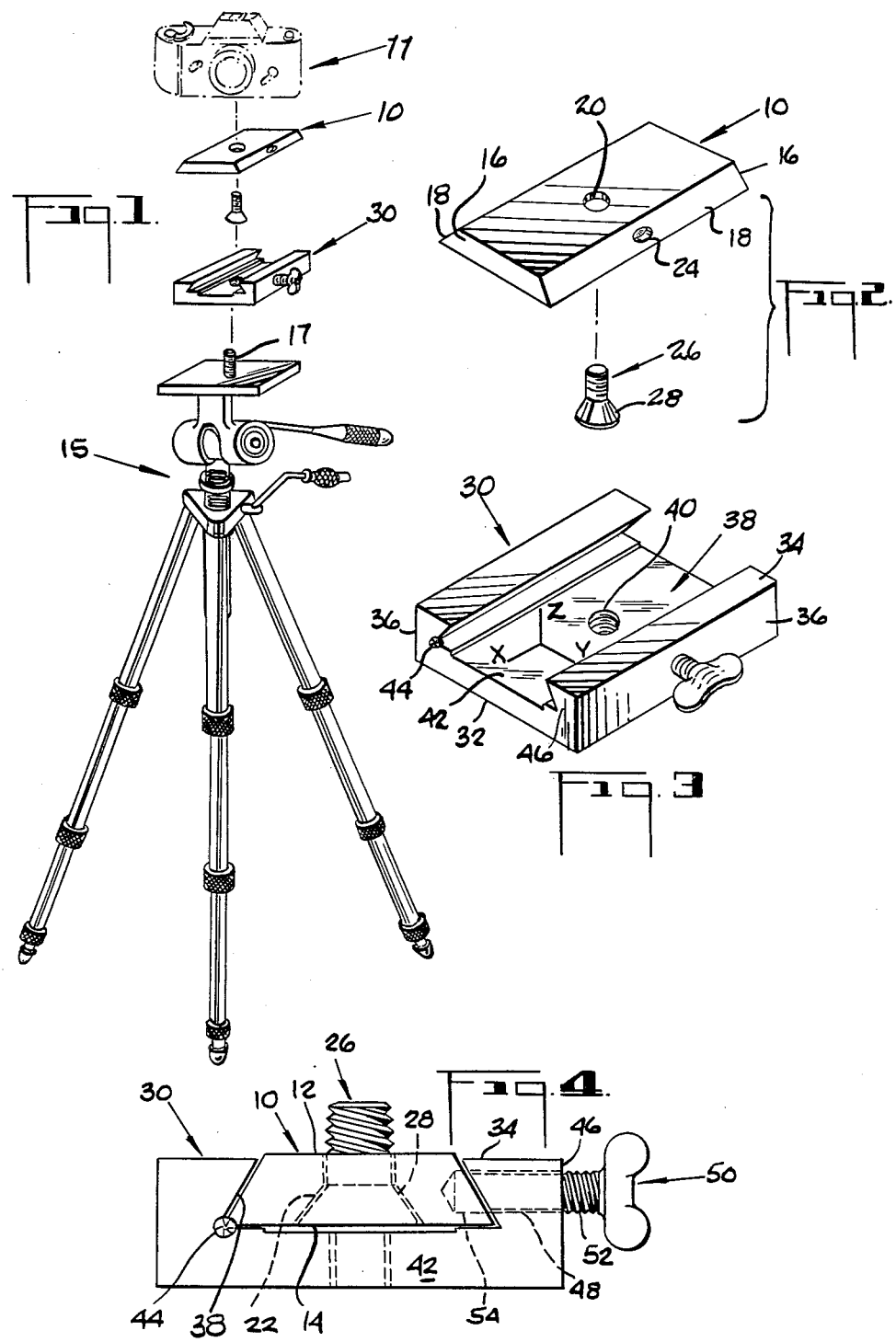

QUICK-CONNECT MOUNT FOR A CAMERA AND TRIPOD

The use of a tripod can improve the quality of almost any prospective photograph by eliminating the tendency of the photographer to move the camera when depressing the shutter actuating button. However, many photographers forego the use of a tripod because of the difficulties associated with mounting their cameras on the tripods. Most cameras have a standard sized, threaded aperture for tripod mounting, and accordingly, all tripods are equipped with a mating threaded stud for engagement with the camera aperture. Nonetheless, grappling with the tripod while trying to achieve proper thread alignment and rotating the camera is not an easy task.

Some commercially available tripods are equipped with quick-connect mounts. These so-called, quick-connect mounts are generally complex, requiring tricks of their own to effect mounting. Such tripods are generally one or more orders of magnitude more expensive than standard tripods.

The present invention has been designed to permit the user to effect connection between camera and tripod both quickly and easily. Further, the quick-connect mount of the present invention can be added to any camera and tripod for a fraction of the cost of most similar devices.

The quick-connect mount of the present invention comprises a receiving member with a longitudinally extending dovetail slot and vertically extending threaded aperture for attachment to the threaded stud of the tripod. A dovetail shaped connector plate mates with the slot in the receiving member by longitudinally sliding therein. The connector plate is secured to the camera by a flat-head screw which is received in a through bore in the center of the plate, which through bore is countersunk to receive the tapered head of the screw. A longitudinal stop at one end of the slot prevents the connector plate from sliding out (or in) that end. The tip of a thumb screw which is threaded through one side of the receiving member engages in a recess in the side of the connector plate and locks the connector plate in the receiving member.

Various other features, characteristics and advantages of the present invention will become apparent after a reading of the following description.

BRIEF DESCRIPTION OF THE DRAWINGS

FIG. 1 is an exploded elevational view depicting the relative relationships of the components of the present invention to the camera and tripod;

FIG. 2 is an enlarged elevation of the dovetailed connector plate of the present invention and screw for attachment thereof to the camera;

FIG. 3 is an enlarged elevation of the receiving member of the present invention and the thumb screw for securing the connector plate thereto; and FIG. 4 is an enlarged end view of the components of the present invention in assembled position.

DETAILED DESCRIPTION OF THE PREFERRED EMBODIMENT

The quick-connect mount of the present invention includes a connector plate 10 and a receiving member 30. These components are best seen separately in FIGS. 2 and 3, respectively, and as assembled in FIG. 4. FIG. 1 shows the relative relationships of the plate 10 and receiving member 30 with respect to camera 11 and tripod 15. It should be noted here that while connector plate 10 and receiving member 30 are depicted in FIG. 1 as extending out of the paper in order to better show their features, in actual usage connector plate 10 will extend along the major axis of camera 11 and receiver plate 30 will extend parallel to the base of the triangle formed by the legs of the tripod 15. In this manner, the camera lens will be directed out over one of the tripod legs, which is optimum orientation for maximum tripod stability.

Connector plate 10 comprises a rectangular member with upper surface 12 and lower surface 14. The end surfaces 16 extend generally perpendicularly to the upper and lower surfaces while side edges 18 are beveled to give connector plate 10 a dovetail configuration. In the preferred embodiment, the connector plate is made out of metal. More specifically, the connector plate 10 is preferably made out of extruded aluminium. However, connector plate 10 could also be made of a tough, durable plastic such as polyethylene or other suitable material.

A through bore 20 extends from lower surface 14 to upper surface 12 through the approximate center of connector plate 10 to receive the shank of flat-head screw 26. As can best be seen in FIG. 4, through bore 20 has a countersunk portion 22 which receives the beveled portion 28 of flat-head screw 26. A small recess 24 is formed in one beveled edge 18 for reasons to be discussed hereafter. The screw 26 is a standard ¼"×20 flat-head screw which may have any type of drive recess desired. The shank of screw 26 extends beyond through bore 20 and is received in a threaded recess (not shown) in camera 11. The threaded recesses in cameras are standardized to receive ¼" diameter, 20 thread per inch screws and, hence, the size selection of flat-head screw 26.

Receiving member 30 is, also, generally rectangular with bottom surface 32, top surface 34, and side surfaces 36. A dovetail slot 38 extends longitudinally through receiving member 30. A threaded aperture 40 (also ¼"×20) extends substantially through the center of flange portion 42 and is adapted to engage threaded stud 17 of tripod 15. One end of slot 38 is staked as at 44, or the like, in order to close off one end of the slot 38. Threaded through bore 48 extends through side portion 46 which rises above flange 42. Through bore 48 receives threaded shank 52 of thumb screw 50. The tip 54 of thumb screw 50 is received in recess 24. Receiving member 30 is also preferably of extruded aluminium although, here again, other materials could be used.

In use, receiving member 30 is secured to tripod 15 by aperture 40 threadingly engaging stud 17. Connector plate 10 is attached to camera 11 by inserting screw 26 into the through bore 20 and threading it into the recess in the camera. These components remain affixed to the tripod and camera respectively. To mount the camera 11 on the tripod 15, dovetail shaped connector plate 10 is slid longitudinally into the open end of dovetail slot 38 with recess 24 toward the side having thumb screw 50. This engagement prevents translational movement along the y- and z-dimensional axes and rotational movement about all three axes (FIG. 3). Engagement with material staked at 44 prevents movement in one direction along the x-axis. Tightening of thumb screw 50 inserts the screw tip 54 in recess 24 preventing translational movement in the opposite direction along the x-axis and locking the camera on the tripod. Upper surface 12 of connector plate 10 may be designed to extend above top surface 34 of receiving member 30. With such a configuration, connector plate 10 may be mounted on the exterior of a leather camera case and enable attachment to the tripod without removal from the carry case. Such leather cases have lens protecting portion which is hinged to, or snaps off of, the main portion of the case to allow camera usage without removing the entire case.

Various changes, modifications or alternatives will become apparent following a reading of the foregoing specification. For example, although dovetail connections are shown and are preferred, the connector, and slot could have other shape, including generally cylindrical (i.e., the connector could be a rod, and the receiving member a slotted mating cylinder). In addition, although the thread engagement between receiving member 30 and stud 17 is by means of an integrally tapped hole, obviously a separate nut in a countersunk recess could be provided. Accordingly, it is intended that all such changes, modifications and alternatives as come within the scope of any of the appended claims be considered part of the present invention.

I claim:

1. A quick-connect mount for attachment of a camera to a tripod, said mount comprising:
   (a) a receiving member having a longitudinally extending slot with a first shape, the shape of said slot being defined by first immovable wall portions;
   (b) first means for attaching said receiving member to said tripod, said first attaching means preventing translational and rotational displacement between said tripod and said receiving member;
   (c) a connector plate having a second shape which mates with the slot of said first shape by sliding engagement, said second shape being defined by second immovable wall portions, engagement between said connector plate and said receiving member preventing relative translation between said plate and said member along two of the three dimensional axes and relative rotation about all three axes;
   (d) second means for attaching said connector plate to said camera, said second attaching means preventing translational and rotational displacement between said camera and said connector plate; and
   (e) means for securing said connector plate to said receiving member to prevent translation along the third dimensional axis, thereby securing said camera to said tripod.

2. The quick-connect mount of claims 1 wherein said first shape of said slot is a dovetail.

3. The quick-connect mount of claim 1 wherein said first means for attaching said receiving member to the tripod comprises a threaded stud fixedly attached to said tripod and a threaded aperture in said receiving member.

4. The quick-connect mount of claim 1 wherein said second means for attaching said connector plate to said camera comprises a threaded aperture in said camera and a matable flat-head screw which is received in a through bore extending through the approximate center of said connector plate.

5. The quick-connect mount of claim 4 wherein the through bore of said connector plate has a countersunk portion for receiving a tapered portion of said flat-head screw.

6. The quick-mount of claim 1 wherein said means for securing said connector plate to said receiving member comprises a recess in a side of said connector plate and a thumb screw received in a threaded through bore in the side of said receiving member, the tip of said screw being received in the recess of said connector plate.

7. The quick-connect mount of claim 6 wherein said means for securing said connector plate to said receiving member further comprises staked material at one end of said receiving member forming a longitudinal stop.

* * * * *